US012767345B1

(12) United States Patent
Meslioui

(10) Patent No.: US 12,767,345 B1
(45) Date of Patent: Oct. 20, 2026

(54) SYSTEM AND METHOD FOR ATTENUATING SOUND IN A GAS TURBINE ENGINE

(71) Applicant: PRATT & WHITNEY CANADA CORP., Longueuil (CA)

(72) Inventor: Sid-Ali Meslioui, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/374,342

(22) Filed: Oct. 30, 2025

(51) Int. Cl.

*B64D 33/04* (2006.01)
*B64D 27/10* (2006.01)
*F02C 7/00* (2006.01)
*F02C 7/24* (2006.01)
*F02K 1/82* (2006.01)

(52) U.S. Cl.

CPC ............. *B64D 33/06* (2013.01); *B64D 27/10* (2013.01); *F02C 7/00* (2013.01); *F02C 7/24* (2013.01); *F02K 1/827* (2013.01); *F05D 2260/96* (2013.01)

(58) Field of Classification Search

CPC . F02K 1/827; B64D 33/06; F02C 7/24; F01D 25/30; F05D 2260/96
See application file for complete search history.

(56) References Cited

U.S. PATENT DOCUMENTS 4,064,961 A * 12/1977 Tseo .................... G10K 11/172 181/213
4,091,892 A 5/1978 Hehmann et al.
4,137,992 A * 2/1979 Herman .................. F02K 1/827 181/269
4,240,519 A * 12/1980 Wynosky ................ F02K 1/827 60/770
4,244,441 A * 1/1981 Tolman ................... F01N 1/003 60/262
4,433,751 A * 2/1984 Bonneau ................ F02K 1/827 181/224
5,162,620 A * 11/1992 Ross ....................... F01D 25/30 181/220
6,935,834 B2 * 8/2005 Lata Perez ................ F02C 7/24 415/115
7,337,875 B2 * 3/2008 Proscia ..................... F02C 7/24 181/290
7,784,283 B2 8/2010 Yu et al.
(Continued)

FOREIGN PATENT DOCUMENTS

WO 2022117968 A1 6/2022

*Primary Examiner* — Alain Chau
(74) *Attorney, Agent, or Firm* — NORTON ROSE FULBRIGHT CANADA LLP

(57) ABSTRACT

A method for sound attenuation in an exhaust section of an aircraft engine is provided. An exhaust is flowed into the exhaust section, via an exhaust inlet, towards an annular body in the exhaust section, the annular body having an radially outer sheet, a radially inner sheet, and an annular cavity defined between the radially outer sheet and the radially inner sheet, the annular cavity being subdivided into sub-cavities by one or more plates in the annular cavity. Acoustic pressure waves are transmitted from the exhaust flow into the sub-cavities via holes defined through the radially outer sheet to attenuate noises generated by the exhaust flow. The exhaust flow is exhausted from the exhaust section via an exhaust outlet.

18 Claims, 10 Drawing Sheets

(56) References Cited

U.S. PATENT DOCUMENTS

| | | | | |
|---|---|---|---|---|
| 7,891,195 | B2 * | 2/2011 | Bouty | F02K 1/827 60/770 |
| 8,037,967 | B2 * | 10/2011 | Mercat | F02K 1/827 244/1 N |
| 8,307,945 | B2 * | 11/2012 | Todorovic | F02K 1/827 60/770 |
| 9,261,008 | B2 * | 2/2016 | Mecuson | F01D 25/30 |
| 9,551,239 | B2 * | 1/2017 | Byrne | F01D 25/30 |
| 11,136,942 | B2 | 10/2021 | Lopez et al. | |
| 11,428,191 | B1 | 8/2022 | Alonso-Miralles et al. | |
| 11,519,302 | B2 * | 12/2022 | Andre | F01D 25/30 |
| 11,572,807 | B2 * | 2/2023 | Ferreira | F02K 1/827 |
| 11,867,077 | B2 | 1/2024 | Sanz Martinez et al. | |
| 12,110,844 | B2 | 10/2024 | Koroly et al. | |
| 2004/0076512 | A1 * | 4/2004 | Lata Perez | F02C 7/24 415/119 |
| 2005/0284690 | A1 * | 12/2005 | Proscia | G10K 11/172 181/210 |
| 2007/0256889 | A1 * | 11/2007 | Yu | F02K 1/04 181/214 |
| 2009/0308686 | A1 * | 12/2009 | Sullivan | F01N 1/003 181/255 |
| 2012/0006614 | A1 * | 1/2012 | Todorovic | F02K 1/827 181/213 |
| 2020/0088135 | A1 * | 3/2020 | Lopez | G10K 11/172 |
| 2020/0232344 | A1 * | 7/2020 | Ferreira | F01D 25/30 |
| 2021/0262364 | A1 * | 8/2021 | Andre | F01D 25/30 |
| 2024/0077046 | A1 | 3/2024 | Gaul et al. | |

* cited by examiner

SYSTEM AND METHOD FOR ATTENUATING SOUND IN A GAS TURBINE ENGINE

TECHNICAL FIELD

The disclosure relates generally to aircraft engines and, more particularly, to noise attenuation in an exhaust section of an aircraft engine.

BACKGROUND

Gas turbine engines generate significant exhaust noise generated by components from the combustion system, particularly at low frequencies. While certain acoustic arrangements in exhaust sections have been employed in the past to attenuate this noise, improvements are sought.

SUMMARY

In one aspect, there is provided a method for sound attenuation in an exhaust section of an aircraft engine, comprising: flowing an exhaust flow into the exhaust section, via an exhaust inlet, towards an annular body in the exhaust section, the annular body having an radially outer sheet, a radially inner sheet, and an annular cavity defined between the radially outer sheet and the radially inner sheet, the annular cavity being subdivided into sub-cavities by one or more plates in the annular cavity; transmitting acoustic pressure waves from the exhaust flow into the sub-cavities via holes defined through the radially outer sheet to attenuate noises generated by the exhaust flow; and exhausting the exhaust flow from the exhaust section via an exhaust outlet.

The method as defined above and described herein includes, in certain embodiment, any one or more of the following steps and/or features, in whole or in part, and in any combination.

In some embodiments, the transmitting the acoustic pressure waves from the exhaust flow into the sub-cavities further includes transmitting the acoustic pressure waves along the one or more plates extending perpendicularly from the radially outer sheet to the radially inner sheet relative to a central longitudinal axis of the aircraft engine.

In some embodiments, the transmitting the acoustic pressure waves from the exhaust flow into the sub-cavities further includes transmitting the acoustic pressure waves along the one or more plates extending tangentially from the radially outer sheet to the radially inner sheet relative to a central longitudinal axis of the aircraft engine.

In some embodiments, the transmitting the acoustic pressure waves from the exhaust flow into the sub-cavities further includes transmitting the acoustic pressure waves from one of the sub-cavities to an adjacent one of the sub-cavities through additional holes disposed through one of the one or more plates.

In some embodiments, the transmitting the acoustic pressure waves from the exhaust flow into the sub-cavities further includes transmitting the acoustic pressure waves from the exhaust flow into a first of the sub-cavities occupying a first volume and into a second of the sub-cavities occupying a second volume different than the first volume.

In some embodiments, the transmitting the acoustic pressure waves from the exhaust flow into the sub-cavities further includes impeding the transmitting of the acoustic pressure waves via an acoustically resistant material defining the one or more plates.

In some embodiments, the method further includes flowing the exhaust flow into one of the sub-cavities via additional holes in the radially outer sheet.

In another aspect, there is provided an exhaust section of an aircraft engine, comprising: an exhaust case extending along a central longitudinal axis, the exhaust case having an exhaust inlet receiving an exhaust flow of the aircraft engine and an exhaust outlet exhausting the exhaust flow; and an annular body disposed in the exhaust case and exposed to the exhaust flow, the annular body having a radially outer sheet, a radially inner sheet, an annular cavity defined between the radially outer sheet and the radially inner sheet, one or more plates disposed in the annular body and subdividing the annular cavity into sub-cavities, one or more holes disposed through the radially outer sheet, the one or more holes configured for transmitting acoustic pressure waves of the exhaust flow into the sub-cavities in the annular cavity.

The exhaust section as defined above and described herein includes, in certain embodiment, any one or more of the following features, in whole or in part, and in any combination.

In some embodiments, the one or more plates extend perpendicularly relative to the central longitudinal axis from the radially outer sheet to the radially inner sheet.

In some embodiments, the one or more plates extends tangentially relative to the central longitudinal axis from the radially outer sheet to the radially inner sheet.

In some embodiments, one or more of the one or more plates includes additional holes disposed therethrough, the additional holes configured for transmitting the acoustic pressure waves from one of the sub-cavities to an adjacent one of the sub-cavities.

In some embodiments, a first of the sub-cavities occupies a different volume than a second of the sub-cavities.

In some embodiments, one or more of the one or more plates is formed of an acoustically resistant material.

In some embodiments, the radially outer sheet includes additional holes configured for flowing the exhaust flow into one of sub-cavities.

In a further aspect, there is provided an aircraft engine, comprising: a combustor section configured for combusting a mixture of fuel and air to produce an exhaust flow; and an exhaust section including an exhaust case extending along a central longitudinal axis between an exhaust inlet receiving the exhaust flow from the combustor section and an exhaust outlet exhausting the exhaust flow, the exhaust section further including an annular body disposed therein and exposed to the exhaust flow, the annular body having a radially outer sheet, a radially inner sheet, an annular cavity defined between the radially outer sheet and the radially inner sheet, one or more plates disposed in the annular body and subdividing the annular cavity into sub-cavities, one or more holes disposed through the radially outer sheet, the one or more holes configured for transmitting acoustic pressure waves of the exhaust flow into the sub-cavities in the annular cavity.

The aircraft engine as defined above and described herein includes, in certain embodiment, any one or more of the following features, in whole or in part, and in any combination.

In some embodiments, the one or more plates extend perpendicularly relative to the central longitudinal axis from the radially outer sheet to the radially inner sheet.

In some embodiments, the one or more plates extends tangentially relative to the central longitudinal axis from the radially outer sheet to the radially inner sheet.

In some embodiments, one or more of the one or more plates includes additional holes disposed therethrough, the additional holes configured for transmitting the acoustic pressure waves from one of the sub-cavities to an adjacent one of the sub-cavities.

In some embodiments, a first of the sub-cavities occupies a different volume than a second of the sub-cavities.

In some embodiments, one or more of the one or more plates is formed of an acoustically resistant material.

BRIEF DESCRIPTION OF THE DRAWINGS

Reference is now made to the accompanying figures in which.

DETAILED DESCRIPTION

Figure 1:
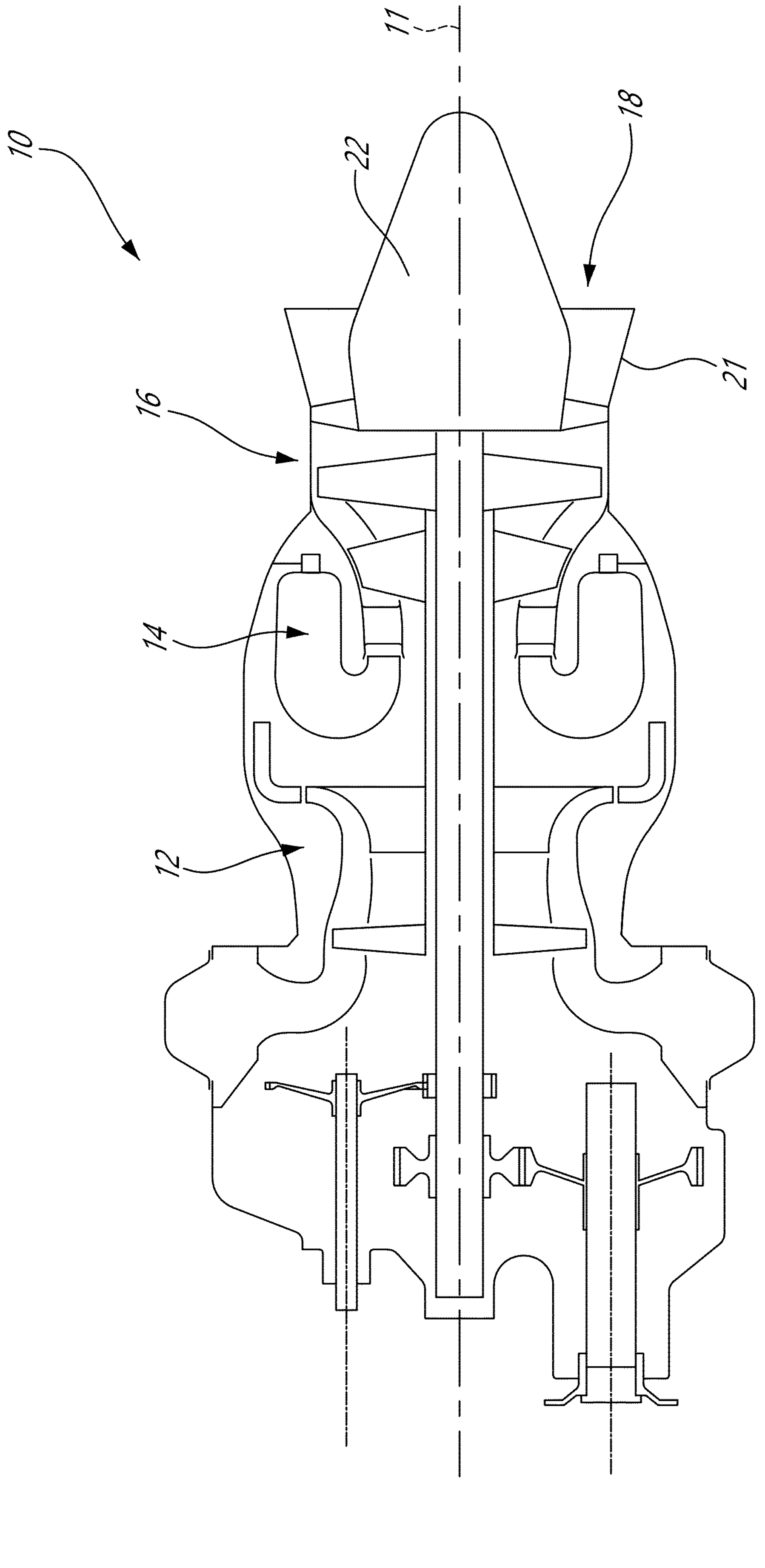
FIG. 1 is a schematic cross sectional view of a gas turbine engine.

FIG. 1 illustrates an example of a gas turbine engine 10. In this example, the gas turbine engine 10 is a turboshaft engine generally comprising in serial flow communication, along a central longitudinal axis 11, a multistage compressor 12 for pressurizing the air, a combustor 14 in which the compressed air is mixed with fuel and ignited for generating an annular stream of hot combustion gases, and a turbine section 16 for extracting energy from the combustion gases before they exit via an exhaust section 18. While FIG. 1 shows engine 10 to be a turboshaft-type aircraft engine, it is understood that other aircraft engine types, such as turbofan and turboprop, as well as hybrid-electric aircraft engines, are contemplated as well. The present disclosure is also applicable to auxiliary power units (APUs) and compounded engines.

Figure 2:
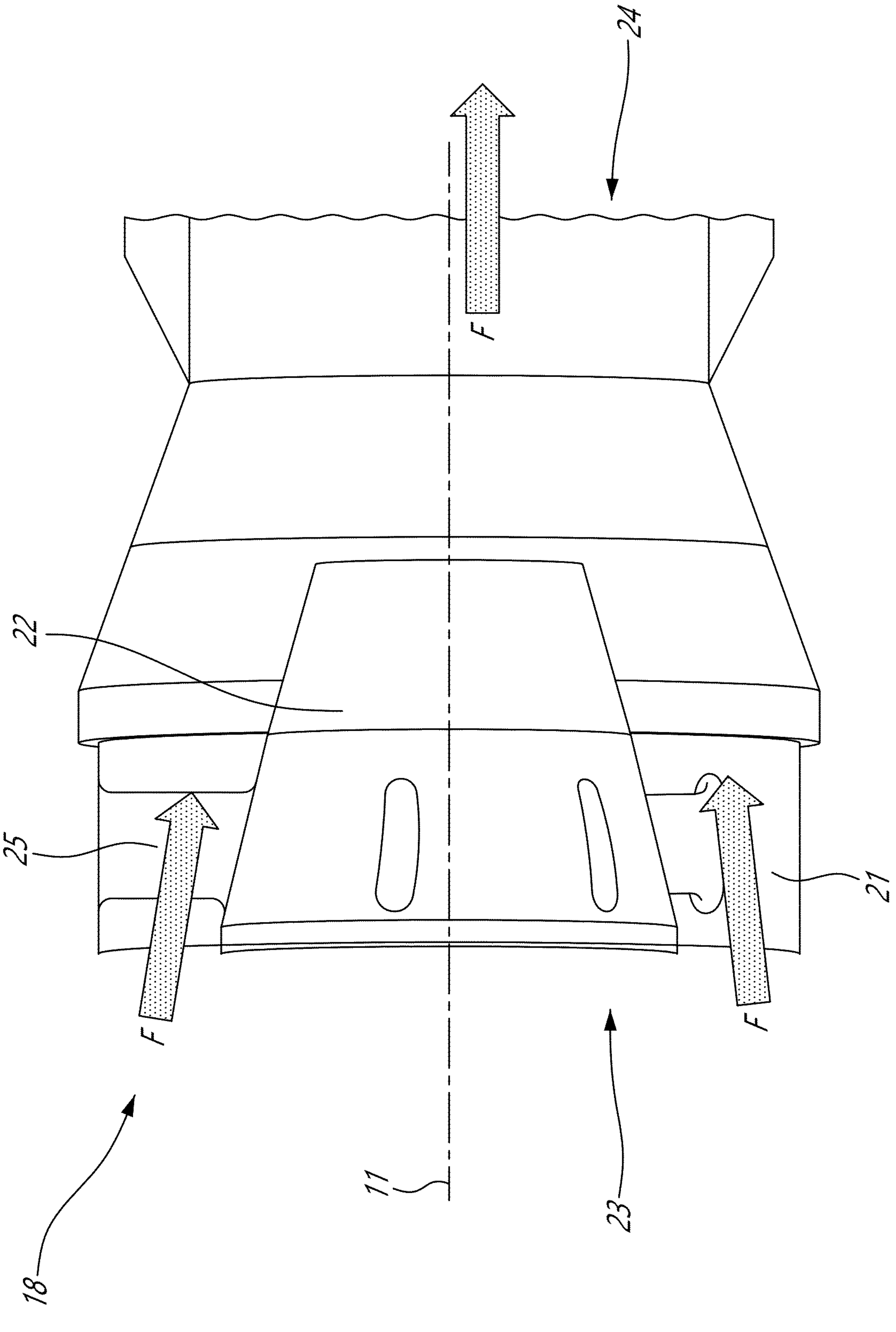
FIG. 2 is a schematic cross sectional view of an exhaust outlet for the engine of FIG. 1.

Referring additionally to FIG. 2, the exhaust section 18 illustratively includes an exhaust case 21 extending about the axis 11 and a center body 22, also referred to as a bullet or an annular body. The exhaust section 18 includes an exhaust inlet 23 receiving an exhaust flow F from the core engine sections (i.e., compressor section 14 and turbine section 16) and an exhaust outlet for expelling the exhaust flow F outbound of engine 10 into the surrounding environment. The center body 22 is illustratively mounted to the exhaust case 21 via one or more struts 25 and is configured for guiding the exhaust flow F as it passes through the exhaust section 18. In addition, the center body 22 described herein is configured for attenuating various noises of the exhaust flow F. Various configurations for the center body 22, presented below as 22A-22H, are contemplated.

Figure 3:
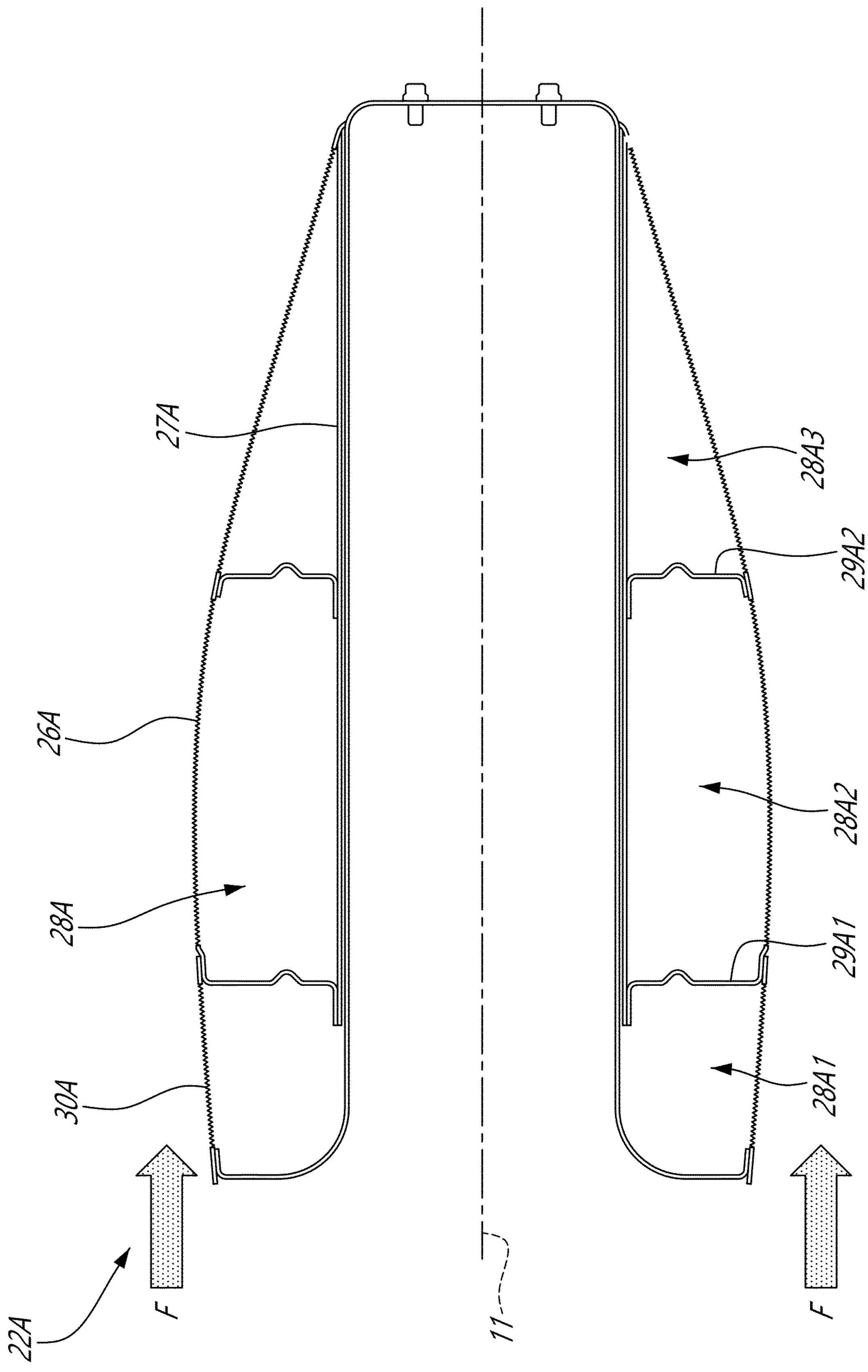
FIG. 3 is a schematic cross sectional view of a central body in the exhaust outlet of FIG. 2, according to an embodiment.

Referring to FIG. 3, an exemplary depiction of a center body 22A is shown, according to an embodiment of the present disclosure. The center body 22A has an annular shape defined by a radially outer sheet 26A and a radially inner sheet 27A, with an annular cavity 28A defined radially between the radially outer sheet 26A and the radially inner sheet 27A. Plates 29A1, 29A2, also referred to as partitions, are provided to subdivide the annular cavity 28A into multiple sub-cavities 28A1-28A3. In the shown case, two plates 29A1, 29A2 subdivide the annular cavity 28A into three sub-cavities 28A1-28A3. Other numbers of plates 29A1, 29A2 and sub-cavities 28A1-28A3 are contemplated, for instance based on the required noise attenuating performance and the overall size of the center body 22A. In the shown case, the plates 29A1, 29A2 extend generally perpendicularly relatively to the axis 11 from the radially outer sheet 26A to the radially inner sheet 27A such that the sub-cavities 28A1-28A3 are generally arranged axially. Other configurations are contemplated, for instance axially-extending plates 29A1, 29A2 such that the sub-cavities 28A1-28A3 are arranged concentrically. In embodiments, the plates 29A1, 29A2 are configured for providing structural rigidity to the center body 22A.

As noted above, the center body 22A is configured for attenuating noises of the exhaust flow F. In particular, one or more holes 30A are provided through the radially outer sheet 26A to provide an impedance to the exhaust flow F and to allow acoustic pressure waves to travel into the sub-cavities 28A1-28A3. The number and arrangement of the holes 30A can vary, for instance, to provide a specific percentage of open area (POA) of the radially outer sheet 26A. Various materials for the radially outer sheet 26A are contemplated, for instance various metals, composites or other materials capable of withstanding the high temperatures and harsh environment in the exhaust section 18. The noise attenuating performance of the center body 22A is tuned, for instance, based on the POA of the radially outer sheet 26A, the number of sub-cavities 28A1-28A3, the volume of each sub cavity 28A1-28A3, and the shape of each sub cavity 28A1-28A3. Other variables affecting the noise attenuating performance of the center body 22A are contemplated. In some embodiments, one or more of the sub-cavities 28A1-28A3 is sized and/or shaped differently from the others, for instance, to target different noise frequencies to attenuate.

Figure 4:
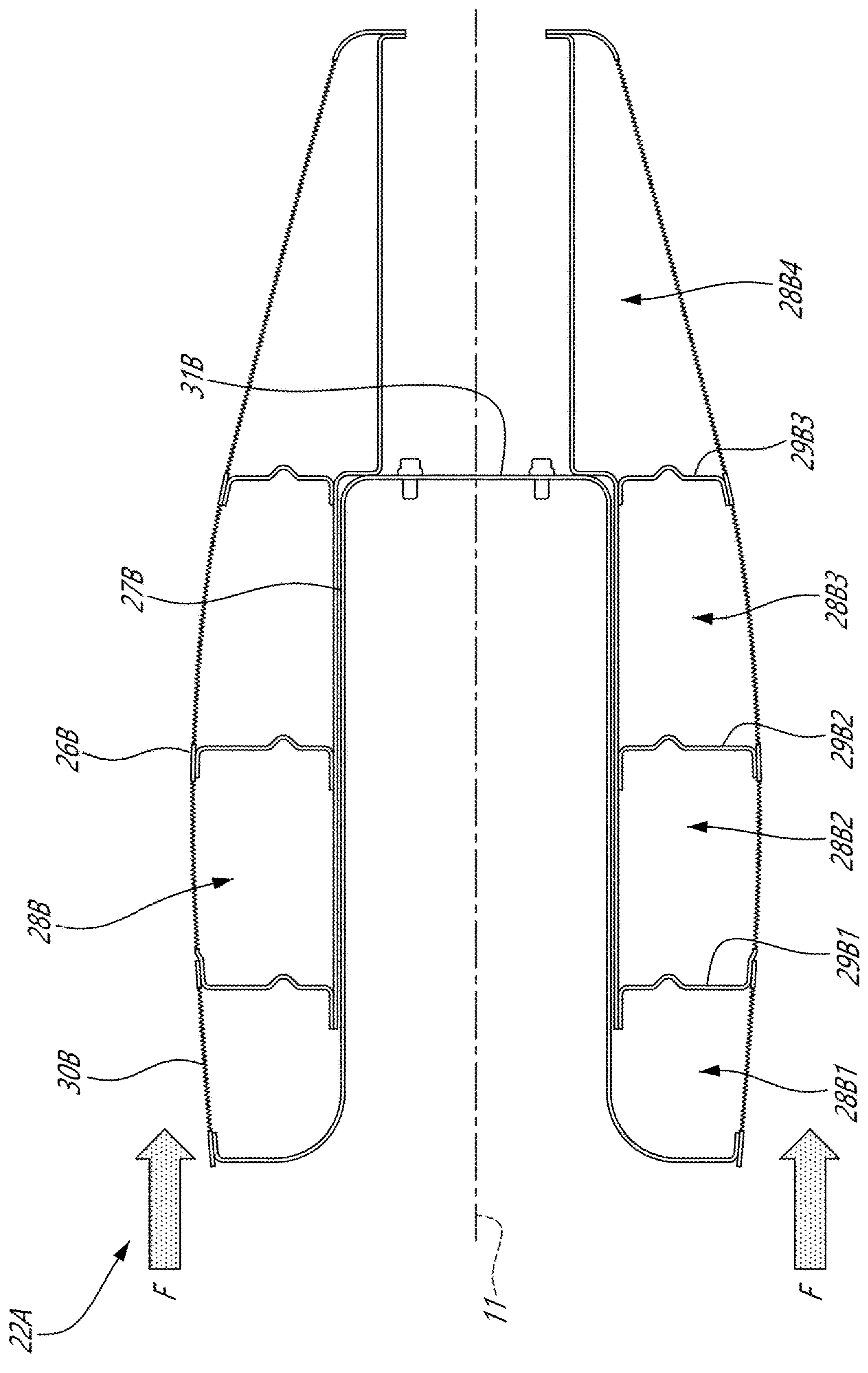
FIG. 4 is a schematic cross sectional view of a central body in the exhaust outlet of FIG. 2, according to another embodiment.

Referring to FIG. 4, another exemplary depiction of a center body 22B is shown, according to an embodiment of the present disclosure. The center body 22B has an annular shape defined by a radially outer sheet 26B and a radially inner sheet 27B, with an annular cavity 28B defined radially between the radially outer sheet 26B and the radially inner sheet 27A. Plates 29B1-29B3, also referred to as partitions, are provided to subdivide the annular cavity 28B into multiple sub-cavities 28B1-28B4. In the shown case, three plates 29B1-29B3 subdivide the annular cavity 28B into four sub-cavities 28B1-28B4. Other numbers of plates 29B1-29B3 and sub-cavities 28B1-28B4 are contemplated, for instance based on the required noise attenuating performance and the overall size of the center body 22B. In the shown case, the plates 29B1-29B3 extend generally perpendicularly relatively to the axis 11 from the radially outer sheet 26*b* to the radially inner sheet 27*b* such that the sub-cavities 28B1-28B4 are generally arranged axially. Other configurations are contemplated, for instance axially-extending plates 29B1-29B3 such that the sub-cavities 28B1-28B4 are arranged concentrically. In embodiments, the plates 29B1-29B3 are configured for providing structural rigidity to the center body 22B.

As noted above, the center body 22B is configured for attenuating noises of the exhaust flow F. In particular, one or more holes 30B are provided through the radially outer sheet 26B to provide an impedance to the exhaust flow F and to allow acoustic pressure waves to travel into the sub-cavities 28B1-28B4. The number and arrangement of the holes 30B can vary, for instance, to provide a specific percentage of open area (POA) of the radially outer sheet 26B. Various materials for the radially outer sheet 26B are contemplated, for instance various metals, composites or other materials capable of withstanding the high temperatures and harsh environment in the exhaust section 18. The noise attenuating performance of the center body 22B is tuned, for instance, based on the POA of the radially outer sheet 26B, the number of sub-cavities 28B1-28B4, the volume of each sub cavity 28B1-28B4, and the shape of each sub cavity 28B1-28B4. Other variables affecting the noise attenuating performance of the center body 22B are contemplated. In some embodiments, one or more of the sub-cavities 28B1-28B4 is sized and/or shaped differently from the others, for instance, to target different noise frequencies to attenuate.

Still referring to FIG. 4, in the shown embodiment, the center body 22B further includes a liner 31B disposed radially inwardly of the radially inner sheet 27B and configured for imposing a local control of the boundary layer displacement above the radially outer sheet 26B towards a downstream end of the center body. Various liner 31B types are contemplated, for instance a variable impedance liner, a segmented impedance liner, or an adaptive liner. Such local control is achieved, for instance, by selecting a POA and hole 30B sizes such that the boundary layer from the velocity profile influences the acoustic impedance. Passive control of the boundary layer profile above the acoustic surfaces is thus provided by artificially sucking the boundary layer through holes towards the downstream end of the center body 22B and therefore control or adapt the acoustic impedance. An aerodynamic shape of the center body 22B can be provided to further contribute to this mechanism, for instance to favor a backpressure difference between the upstream and downstream portions of the downstream end of the center body 22B. Other configurations are contemplated.

Figure 5:
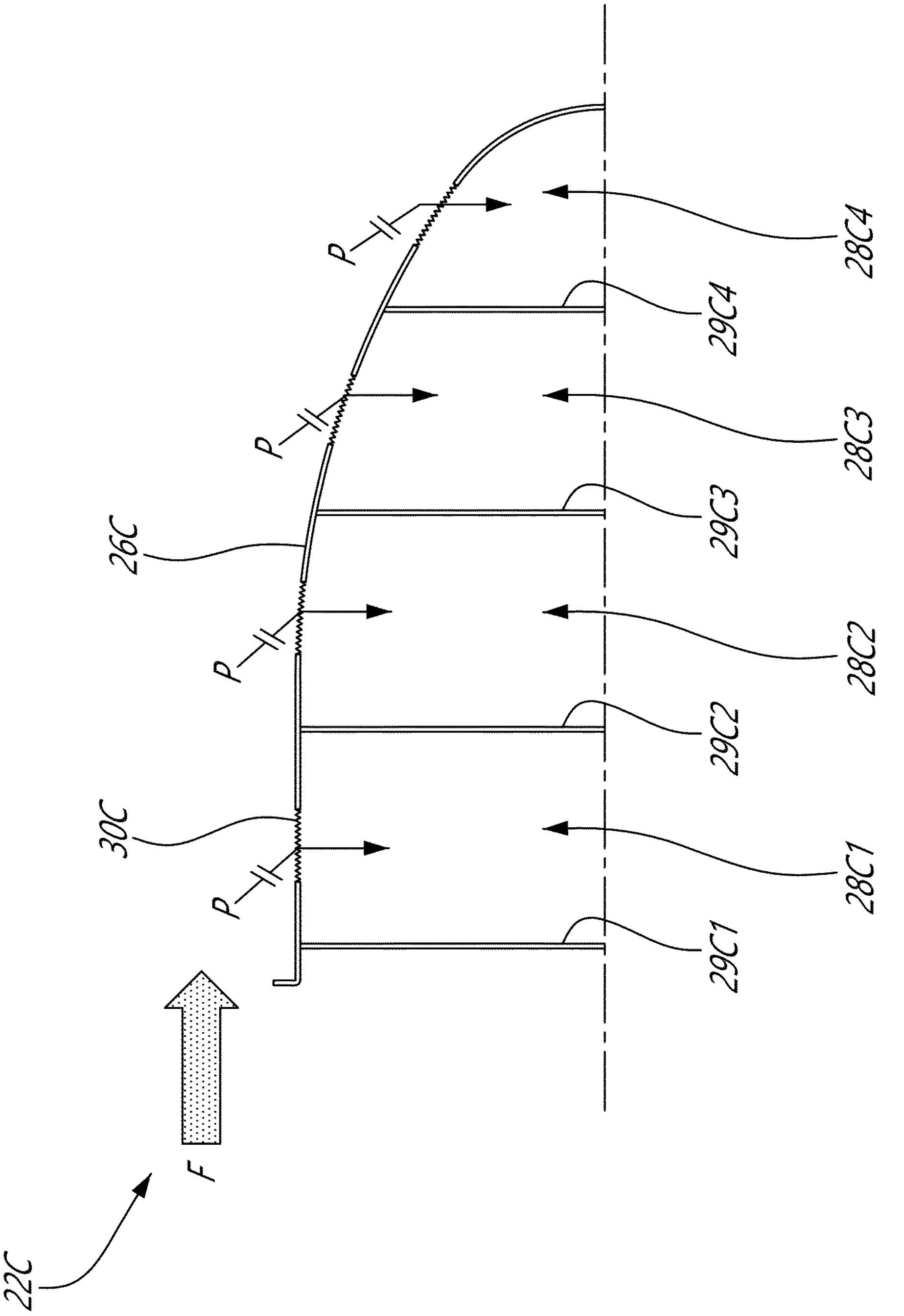
FIG. 5 is an enhanced schematic cross sectional view of a central body in the exhaust outlet of FIG. 2, according to an embodiment.

Referring now to FIG. 5, a portion of another exemplary depiction of a center body 22C is shown, according to an embodiment of the present disclosure. In the shown embodiment, the radially outer sheet 26C includes a plurality of holes 30C configured to transmit acoustic pressure waves P propagating with the exhaust flow F into the sub-cavities 28C1-28C4 of the center body 22C. It is understood that FIG. 5 shows only a portion of the center body 22C, and thus the number of sub-cavities 28C1-28C4 and plates 29C1-29C4 is merely exemplary. In the shown embodiment, the plates 29C1-29C4 are arranged generally perpendicularly to the central axis 11 (see FIGS. 1-4) and are axially spaced generally equidistantly from one another, forming axially-arranged sub-cavities 28C1-28C4 of generally equal widths. The volumes of the sub-cavities 28C1-28C4 illustratively vary due to the tapered profile of the radially outer sheet 26C. In addition, the POA can be tailored (i.e., varied) for each sub-cavity 28C1-28C4. As such, each sub cavity 28C1-28C4 can target different frequencies of the acoustic pressure waves P. Other configurations are contemplated, for instance axially-extending plates 29C1-29C4 forming concentrically-arranged sub-cavities 28C1-28C4.

Figure 6:
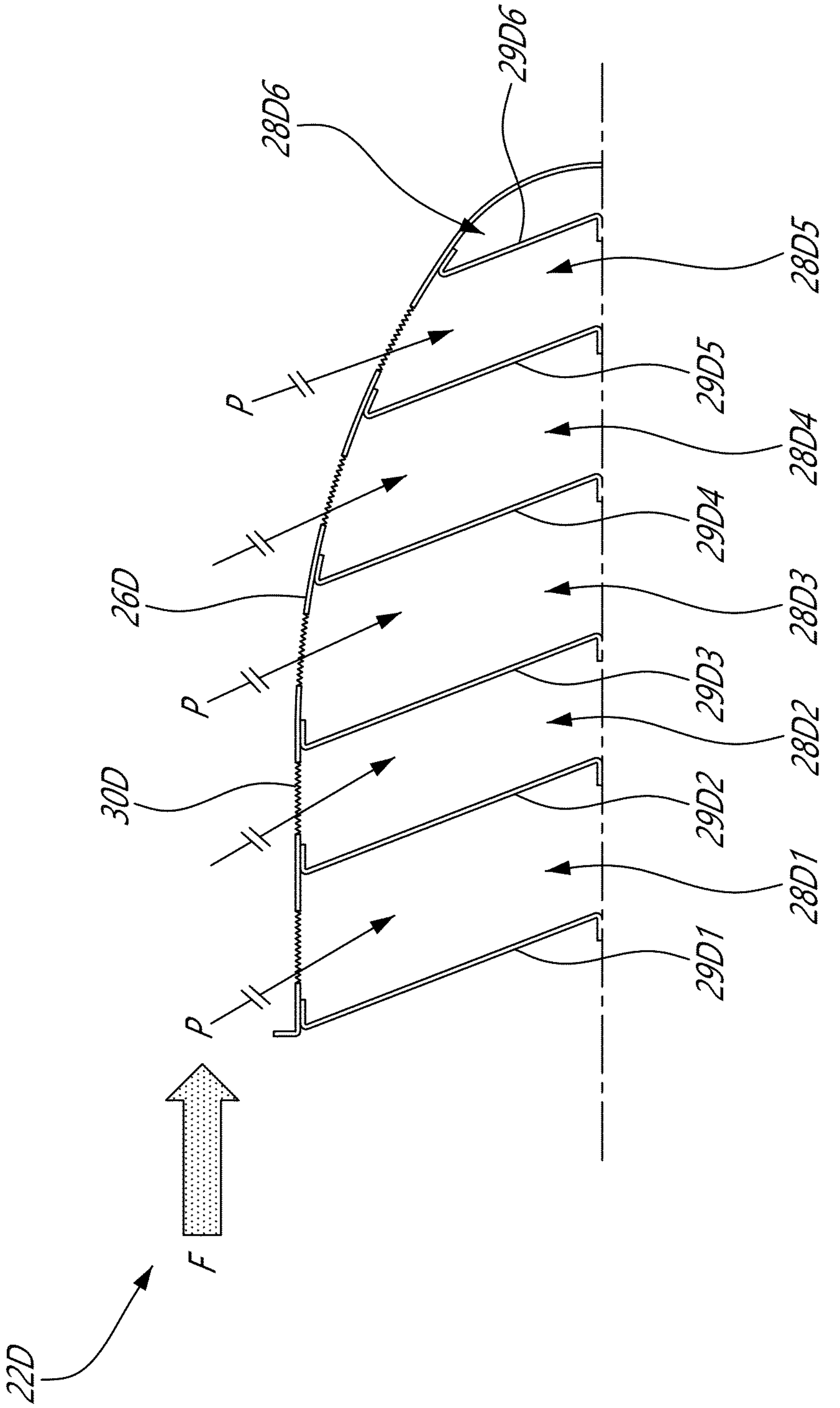
FIG. 6 is an enhanced schematic cross sectional view of a central body in the exhaust outlet of FIG. 2, according to another embodiment.

Referring now to FIG. 6, a portion of another exemplary depiction of a center body 22D is shown, according to an embodiment of the present disclosure. In the shown embodiment, the radially outer sheet 26D includes a plurality of holes 30D configured to transmit acoustic pressure waves P from the exhaust flow F into the sub-cavities 28D1-28D6 of the center body 22D. It is understood that FIG. 6 shows only a portion of the center body 22D, and thus the number of sub-cavities 28D1-28D6 and plates 29D1-29D6 is merely exemplary. In the shown embodiment, the plates 29D1-29D6 are arranged generally transversely to the central axis 11 (see FIGS. 1-4). The angled plates 29D1-29D6, which are longer than the corresponding plates 29C1-29C4 shown in FIG. 5, thus form axially-arranged sub-cavities 28D1-28D6 having greater respective cavity depths than the sub-cavities 28C1-28C4 shown in FIG. 5. The cavity depths of the sub-cavities 28D1-28D6 illustratively vary due to the tapered profile of the radially outer sheet 26D. As such, each sub cavity 28D1-28D6 can target different frequencies of the acoustic pressure waves P. Other configurations are contemplated.

Figure 7:
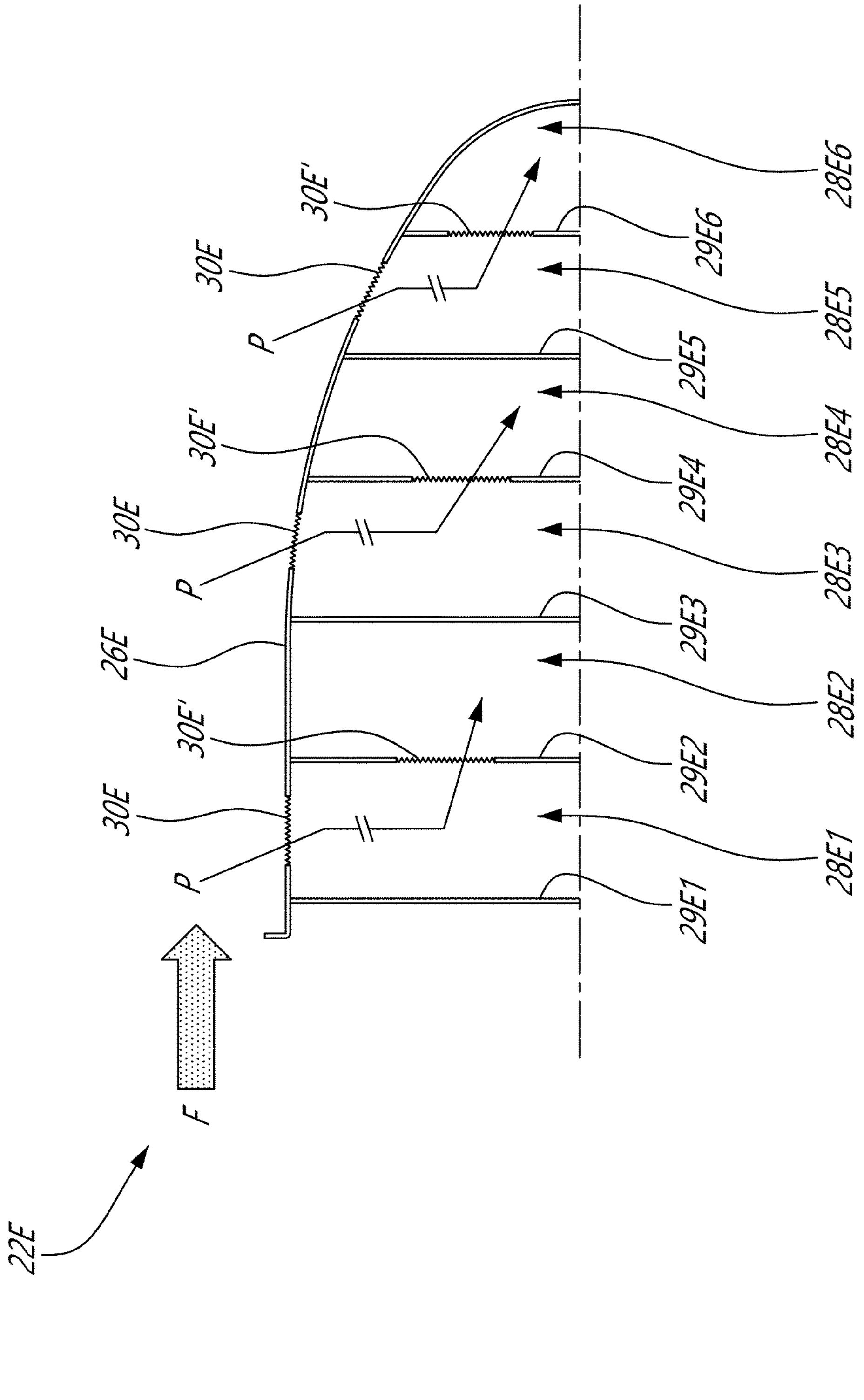
FIG. 7 is an enhanced schematic cross sectional view of a central body in the exhaust outlet of FIG. 2, according to yet another embodiment.

Referring now to FIG. 7, a portion of another exemplary depiction of a center body 22E is shown, according to an embodiment of the present disclosure. In the shown embodiment, the radially outer sheet 26E includes a plurality of holes 30E configured to transmit acoustic pressure waves P from the exhaust flow F into at least some of the sub-cavities 28E1-28E6 of the center body 22E. It is understood that FIG. 7 shows only a portion of the center body 22E, and thus the number of sub-cavities 28E1-28E4 and plates 29E1-29E6 is merely exemplary. In the shown embodiment, the plates 29E1-29E6 are arranged generally perpendicularly to the central axis 11 (see FIGS. 1-4) and are axially spaced generally equidistantly from one another, forming axially-arranged sub-cavities 28E1-28E6 of generally equal widths. The volumes of the sub-cavities 28E1-28E6 illustratively vary due to the tapered profile of the radially outer sheet 26E. As such, each sub cavity 28E1-28E6 can target different frequencies of the acoustic pressure waves P. Other configurations are contemplated. In addition, in the shown embodiment, some of the plates 29E1-29E6, illustratively three plates 29E2, 29E4 and 29E6, include additional holes 30E' extending therethrough to allow the acoustic pressure waves P to travel from one sub cavity (e.g., sub cavity 28E1) to an adjacent sub cavity (e.g., sub cavity 28E2), which is otherwise sealed. Stated differently, pairs of adjacent sub-cavities 28E1-28E6 can work as a pair to perform the noise attenuation, with the additional holes 30E' providing additional attenuation. By extending the effective length travelled by the acoustic pressure waves P through the adjacent sub-cavities, lower noise frequencies can be targeted. In the shown case, the sub-cavities 28E1-28E6 are arranged such that a first of an adjacent pair of sub-cavities (illustratively 28E1, 28E3, 28E5) receive the acoustic pressure waves P via the holes 30E in the radially outer sheet 26E, while a second of an adjacent pair of sub-cavities (illustratively 28E2, 28E4, 28E6) receive the acoustic pressure waves P via the additional holes 30E' from the adjacent sub cavity 28E1, 28E3, 28E5. Other arrangements are contemplated.

Figure 8:
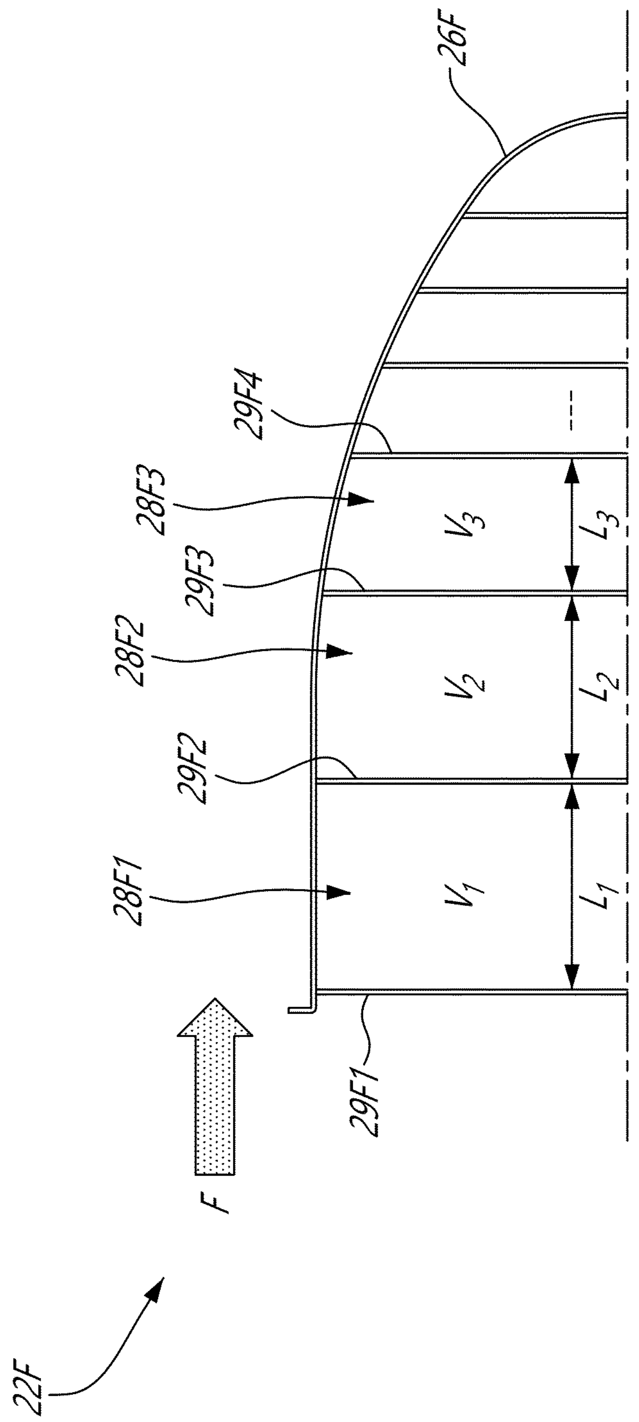
FIG. 8 is an enhanced schematic cross sectional view of a central body in the exhaust outlet of FIG. 2, according to yet another embodiment.

Referring now to FIG. 8, a portion of another exemplary depiction of a center body 22F is shown, according to an embodiment of the present disclosure. For clarity, holes 30 through the radially outer sheet 26F are not shown, but it is understood that they are nonetheless provided for transmitting pressure waves P from the exhaust flow F into the various sub-cavities 28F1-28F4, for instance, in the same manner as shown in FIG. 5. It is understood that FIG. 8 shows only a portion of the center body 22F, and thus the number of sub-cavities 28F1-28F4 and plates 29F1-29F4 is merely exemplary. In the shown embodiment, the plates 29F1-29F4 are arranged generally perpendicularly to the central axis 11 (see FIGS. 1-4) and are axially spaced non-regularly from one another. Alternatively, the plates 29F1-29F4 can be arranged generally transversely to the central axis 11 (see FIGS. 1-4). In particular, the distance L1-L3 between adjacent plates 29F1-29F4 decreases from the upstream end to the downstream end of the center body 22F. This decrease in distance L1-L3, combined with the tapered profile of the radially outer sheet 26F, cause the volumes of the sub-cavities 28F1-28F4 to vary from one to the other. As such, each sub cavity 28F1-28F4 can target different frequencies of the acoustic pressure waves P. The various distances L1-L3 can be selected based on the desired frequencies to be targeted for noise attenuation, thereby broadening the attainable attenuation spectrum.

Figure 9:
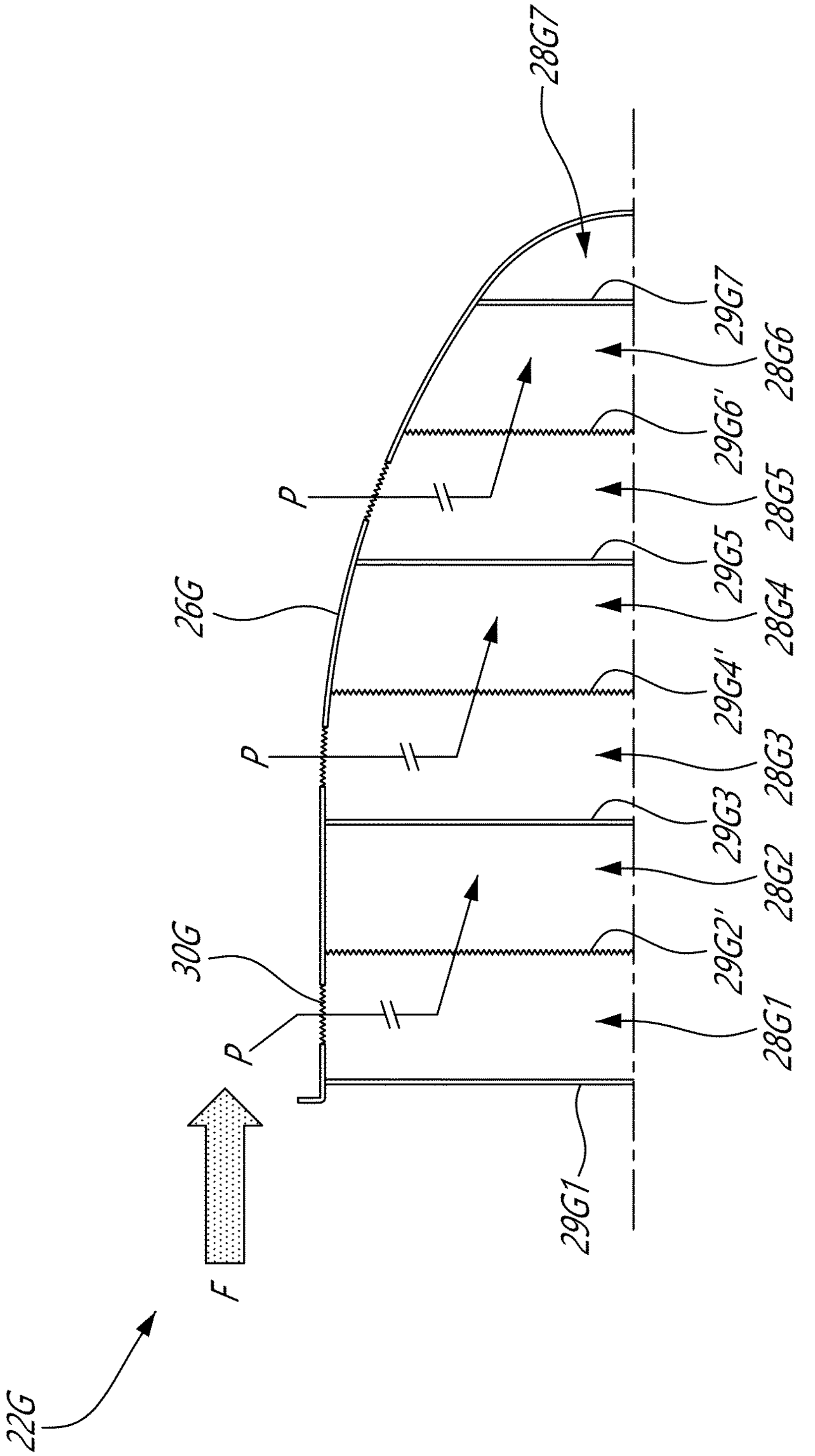
FIG. 9 is an enhanced schematic cross sectional view of a central body in the exhaust outlet of FIG. 2, according to yet another embodiment.

Referring now to FIG. 9, a portion of another exemplary depiction of a center body 22G is shown, according to an embodiment of the present disclosure. In the shown embodiment, the radially outer sheet 26G includes a plurality of holes 30G configured to transmit acoustic pressure waves P from the exhaust flow F into at least some of the sub-cavities 28G1-28G7 of the center body 22G. It is understood that FIG. 9 shows only a portion of the center body 22G, and thus the number of sub-cavities 28G1-28G7 and plates 29G1-29G7 is merely exemplary. In the shown embodiment, the plates 29G1-29G7 are arranged generally perpendicularly to the central axis 11 (see FIGS. 1-4) and are axially spaced generally equidistantly from one another, forming axially-arranged sub-cavities 28G1-28G7 of generally equal widths. The volumes of the sub-cavities 28G1-28G7 illustratively vary due to the tapered profile of the radially outer sheet 26G. As such, each sub cavity 28G1-28G7 can target different frequencies of the acoustic pressure waves P. Other configurations are contemplated. In addition, in the shown embodiment, some of the plates 29G1-29G7, illustratively three plates 29G2', 29G4' and 29G6', are acoustically resistant plates 29G2', 29G4', 29G6' made of an acoustically resistant, passive material configured to increase the acoustic resistance against the acoustic pressure waves P as they travel from one sub cavity (e.g., sub cavity 28G1) to an adjacent sub cavity (e.g., sub cavity 28G2), thereby improving the sound attenuation performance of the center body 22G. In the shown case, the sub-cavities 28G1-28G7 are arranged such that a first of an adjacent pair of sub-cavities (illustratively 28G1, 28G3, 28G5) receive the acoustic pressure waves P via the holes 30G in the radially outer sheet 26G, while a second of an adjacent pair of sub-cavities (illustratively 28G2, 28G4, 28G6) receive the acoustic pressure waves P through acoustically resistant plates 29G2', 29G4', 29G6' from the adjacent sub cavity 28G1, 28G3, 28G5. Other arrangements are contemplated.

Figure 10:
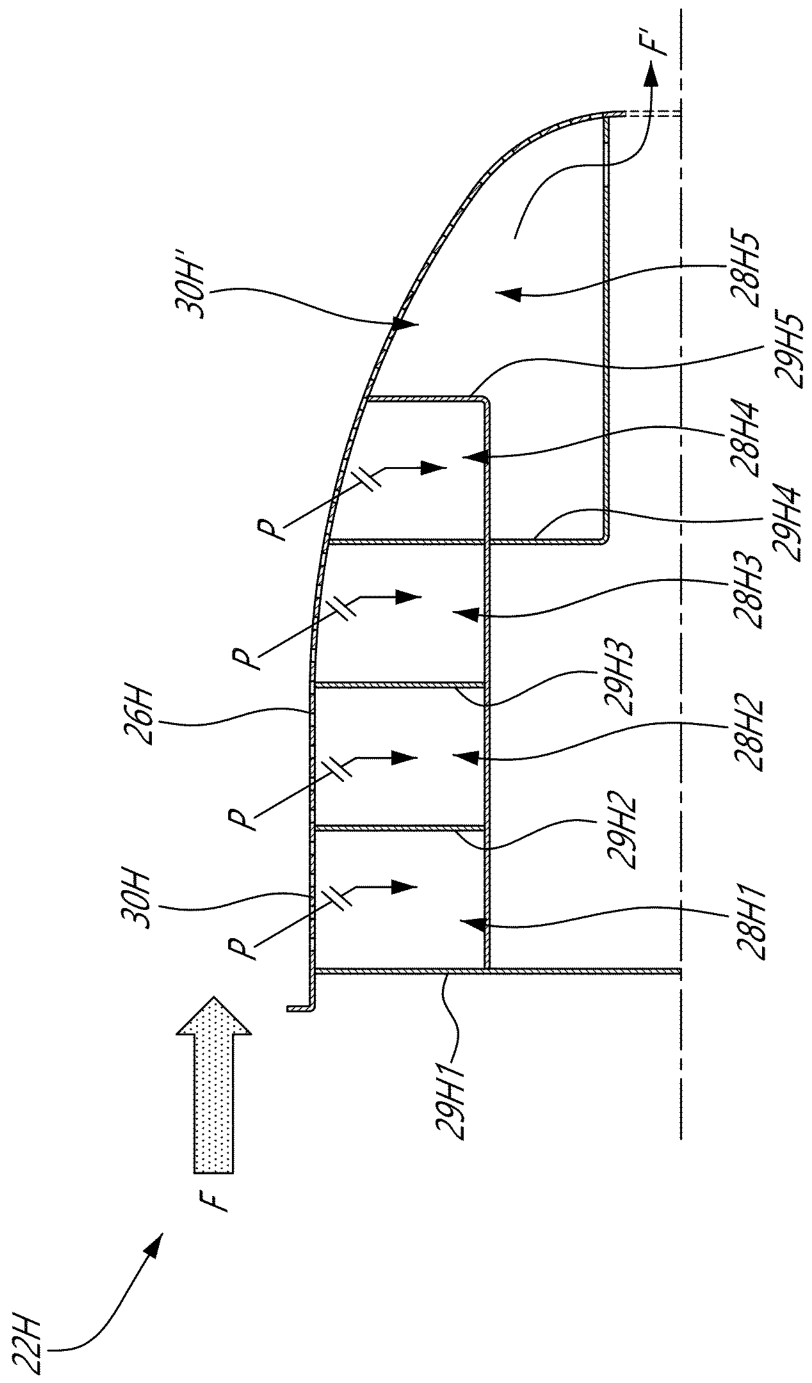
FIG. 10 is an enhanced schematic cross sectional view of a central body in the exhaust outlet of FIG. 2, according to yet another embodiment.

Referring now to FIG. 10, a portion of another exemplary depiction of a center body 22H is shown, according to an embodiment of the present disclosure. In the shown embodiment, the radially outer sheet 26H includes a plurality of holes 30H, illustratively as a fully perforated radially outer sheet 26H, configured to transmit acoustic pressure waves P from the exhaust flow F into at least some of the sub-cavities 28H1-28H4 of the center body 22. It is understood that FIG. 9 shows only a portion of the center body 22H, and thus the number of sub-cavities 28H1-28H5 and plates 29H1-29H5 is merely exemplary. In the shown embodiment, additional holes 30H' are provided through the radially outer sheet 26H, illustratively leading to the downstream-most sub cavity 28H5. The additional holes 30H' are configured for allowing both acoustic pressure waves P and airflow into the sub cavity 28H5. In this embodiment, adaptive impedance is provided by the center body 22H by way of the additional holes 30H', which accounts for the axial growth of the boundary layer along a length of the center body 22H due to its tapered profile. In various embodiments, the number and size of additional holes 30H' is selected to control the boundary layer, thereby modifying the impedance. In particular, the flow drawn F' in through the additional holes 30H' is adapted to modify the boundary layer over this downstream section of the radially outer sheet 26H and reattaching the flow to the radially outer sheet 26H to improve the sound attenuation performance.

According to the present disclosure, there is provided an exemplary method for sound attenuation in an exhaust section 18 of an aircraft engine 10. An exhaust flow F is flowed into the exhaust section 18, via an exhaust inlet 23, towards an annular body 22 in the exhaust section 18 having a radially outer sheet 26, a radially inner sheet 27, an annular cavity 28 defined between the radially outer sheet 26 and the radially inner sheet 27, the annular cavity 28 subdivided into sub-cavities by one or more plates 29 in the annular cavity 28. Acoustic pressure waves P from the exhaust flow F are transmitted into the sub-cavities via holes 30 defined through the radially outer sheet 26 to attenuate noises generated by the exhaust flow F. The exhaust flow F is exhausted from the exhaust section 18 via an exhaust outlet 24. Various additions and modifications to the above-described method are contemplated.

In various embodiments, an exhaust flow F flowing into the exhaust section of an aircraft engine 10 is analyzed to identify one or more frequencies, or frequency ranges, which require attenuation. The center body 22 is thus designed (i.e., size, profile, number of plates and sub-cavities, etc.) so that it is configured to attenuate the one or more frequencies or frequency ranges. In some embodiments, core modes in low frequency ranges (e.g., 100 Hz to 1.5 kHz) are targeted, although frequencies and frequency ranges are contemplated.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term “connected” or “coupled to” may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms “comprises”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to “various embodiments,” “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article “a” as used herein with reference to a particular element is intended to encompass “one or more” such elements, and similarly the use of the definite article “the” in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for sound attenuation in an exhaust section of an aircraft engine, comprising:

flowing an exhaust flow into the exhaust section, via an exhaust inlet, towards an annular body in the exhaust section, the annular body having an radially outer sheet, a radially inner sheet, and an annular cavity defined between the radially outer sheet and the radially inner sheet, the annular cavity being subdivided into sub-cavities by one or more plates in the annular cavity;

transmitting acoustic pressure waves from the exhaust flow into the sub-cavities via holes defined through the radially outer sheet to attenuate noises generated by the exhaust flow;

flowing the exhaust flow into a downstream-most one of the sub-cavities via additional holes in the radially outer sheet, the additional holes configured for transmitting the acoustic pressure waves into the downstream most one of the sub-cavities and for flowing the exhaust flow into the downstream most one of the sub-cavities; and exhausting the exhaust flow from the exhaust section via an exhaust outlet.

2. The method as defined in claim 1, wherein the transmitting the acoustic pressure waves from the exhaust flow into the sub-cavities further includes transmitting the acoustic pressure waves along the one or more plates extending perpendicularly from the radially outer sheet to the radially inner sheet relative to a central longitudinal axis of the aircraft engine.

3. The method as defined in claim 1, wherein the transmitting the acoustic pressure waves from the exhaust flow into the sub-cavities further includes transmitting the acoustic pressure waves along the one or more plates extending at an angle from the radially outer sheet to the radially inner sheet relative to a central longitudinal axis of the aircraft engine.

4. The method as defined in claim 1, wherein the transmitting the acoustic pressure waves from the exhaust flow into the sub-cavities further includes transmitting the acoustic pressure waves from one of the sub-cavities to an adjacent one of the sub-cavities through additional holes disposed through one of the one or more plates.

5. The method as defined in claim 1 wherein the transmitting the acoustic pressure waves from the exhaust flow into the sub-cavities further includes transmitting the acoustic pressure waves from the exhaust flow into a first of the sub-cavities occupying a first volume and into a second of the sub-cavities occupying a second volume different than the first volume.

6. The method as defined in claim 1, wherein the transmitting the acoustic pressure waves from the exhaust flow into the sub-cavities further includes impeding the transmitting of the acoustic pressure waves via an acoustically resistant material defining the one or more plates.

7. An exhaust section of an aircraft engine, comprising:

an exhaust case extending along a central longitudinal axis, the exhaust case having an exhaust inlet receiving an exhaust flow of the aircraft engine and an exhaust outlet exhausting the exhaust flow; and an annular body disposed in the exhaust case and exposed to the exhaust flow, the annular body having a radially outer sheet, a radially inner sheet, an annular cavity defined between the radially outer sheet and the radially inner sheet, one or more plates disposed in the annular body and subdividing the annular cavity into sub-cavities, one or more holes disposed through the radially outer sheet, the one or more holes configured for transmitting acoustic pressure waves of the exhaust flow into the sub-cavities in the annular cavity, the radially outer sheet including additional holes configured for transmitting the pressure waves into a downstream-most one of the sub-cavities and for flowing the exhaust flow into the downstream-most one of the sub-cavities.

8. The exhaust section as defined in claim 7, wherein the one or more plates extend perpendicularly relative to the central longitudinal axis from the radially outer sheet to the radially inner sheet.

9. The exhaust section as defined in claim 7, wherein the one or more plates extends at an angle relative to the central longitudinal axis from the radially outer sheet to the radially inner sheet.

10. The exhaust section as defined in claim 7, wherein one or more of the one or more plates includes additional holes disposed therethrough, the additional holes configured for transmitting the acoustic pressure waves from one of the sub-cavities to an adjacent one of the sub-cavities.

11. The exhaust section as defined in claim 7, wherein a first of the sub-cavities occupies a different volume than a second of the sub-cavities.

12. The exhaust section as defined in claim 7, wherein one or more of the one or more plates is formed of an acoustically resistant material.

13. An aircraft engine, comprising:

a combustor section configured for combusting a mixture of fuel and air to produce an exhaust flow; and an exhaust section including an exhaust case extending along a central longitudinal axis between an exhaust inlet receiving the exhaust flow from the combustor section and an exhaust outlet exhausting the exhaust flow, the exhaust section further including an annular body disposed therein and exposed to the exhaust flow, the annular body having a radially outer sheet, a radially inner sheet, an annular cavity defined between the radially outer sheet and the radially inner sheet, one or more plates disposed in the annular body and subdividing the annular cavity into sub-cavities, one or more holes disposed through the radially outer sheet, the one or more holes configured for transmitting acoustic pressure waves of the exhaust flow into the sub-cavities in the annular cavity, the radially outer sheet including additional holes configured for transmitting the pressure waves into a downstream-most one of the sub-cavities and for flowing the exhaust flow into the downstream-most one of the sub-cavities.

14. The aircraft engine as defined in claim 13, wherein the one or more plates extend perpendicularly relative to the central longitudinal axis from the radially outer sheet to the radially inner sheet.

15. The aircraft engine as defined in claim 13, wherein the one or more plates extends at an angle relative to the central longitudinal axis from the radially outer sheet to the radially inner sheet.

16. The aircraft engine as defined in claim 13, wherein one or more of the one or more plates includes additional holes disposed therethrough, the additional holes configured for transmitting the acoustic pressure waves from one of the sub-cavities to an adjacent one of the sub-cavities.

17. The aircraft engine as defined in claim 13, wherein a first of the sub-cavities occupies a different volume than a second of the sub-cavities.

18. The aircraft engine as defined in claim 13, wherein one or more of the one or more plates is formed of an acoustically resistant material.

* * * * *